United States Patent
Ancin et al.

(10) Patent No.: US 6,227,725 B1
(45) Date of Patent: May 8, 2001

(54) TEXT ENHANCEMENT FOR COLOR AND GRAY-SCALE DOCUMENTS

(75) Inventors: Hakan Ancin; Anoop K. Bhattacharjya, both of Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/135,871

(22) Filed: Aug. 18, 1998

(51) Int. Cl.[7] ............................. G06K 15/02; G06K 9/34; G06K 9/50; G06T 7/00
(52) U.S. Cl. ..................... 395/1.9; 358/1.11; 358/462; 382/176; 382/180; 382/200
(58) Field of Search ..................................... 382/164, 176, 382/180, 199, 200, 205; 358/462, 1.9, 1.11

(56) References Cited

U.S. PATENT DOCUMENTS

| | | | |
|---|---|---|---|
| 4,499,598 | * | 2/1985 | Chittineni ............................. 382/266 |
| 5,381,241 | * | 1/1995 | Kawanaka et al. ................... 358/462 |
| 5,392,365 | * | 2/1995 | Steinkirchner ....................... 382/260 |
| 5,463,451 | | 10/1995 | Acquaviva et al. . |
| 5,583,659 | * | 12/1996 | Lee et al. ............................. 358/455 |
| 5,625,719 | | 4/1997 | Fast et al. . |
| 5,666,443 | | 9/1997 | Kumashiro . |
| 5,710,840 | | 1/1998 | Hideshima et al. . |
| 5,956,468 | * | 9/1999 | Ancin ................................... 358/1.9 |

* cited by examiner

*Primary Examiner*—Scott Rogers

(57) ABSTRACT

A scanner (12) of a photocopier system scans a document and generates output image signals that an image-processing circuit (14) processes in such a manner as to enhance text-region legibility, and a laser printer (16) generates the output copy in accordance with the resultant image. The image-processing circuitry (14) identifies dark, low-saturation pixels in the input image whose gradients are low but that border high-gradient pixels, and it sets these pixels to the blackest values, thus emphasizing text edges. With the remaining pixels, it reduces bright-region contrast, and this tends to suppress the visibility of text that has "bled through" from the document's reverse side or from documents disposed behind it.

14 Claims, 6 Drawing Sheets

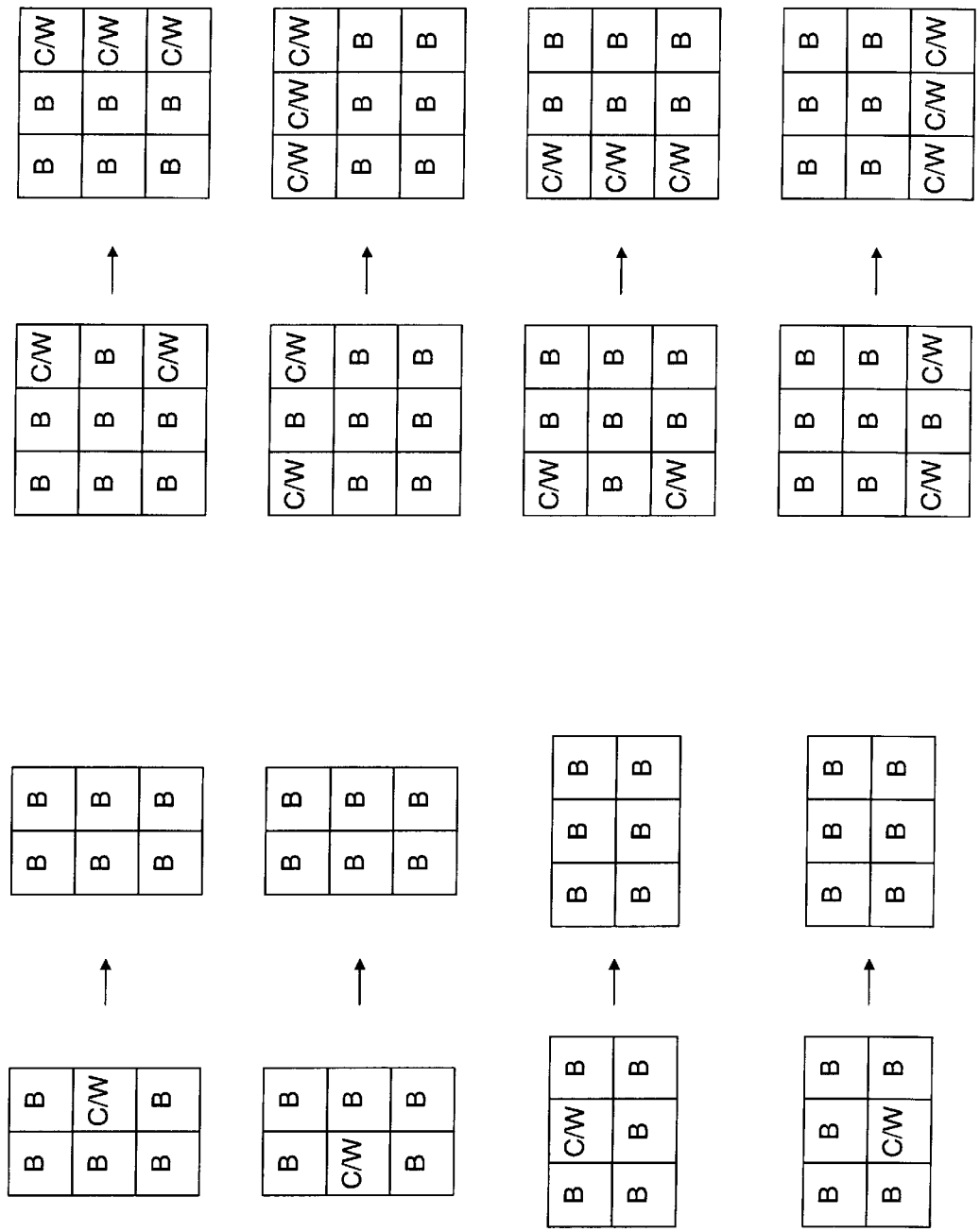

FIG. 4A
FIG. 4B
FIG. 4C

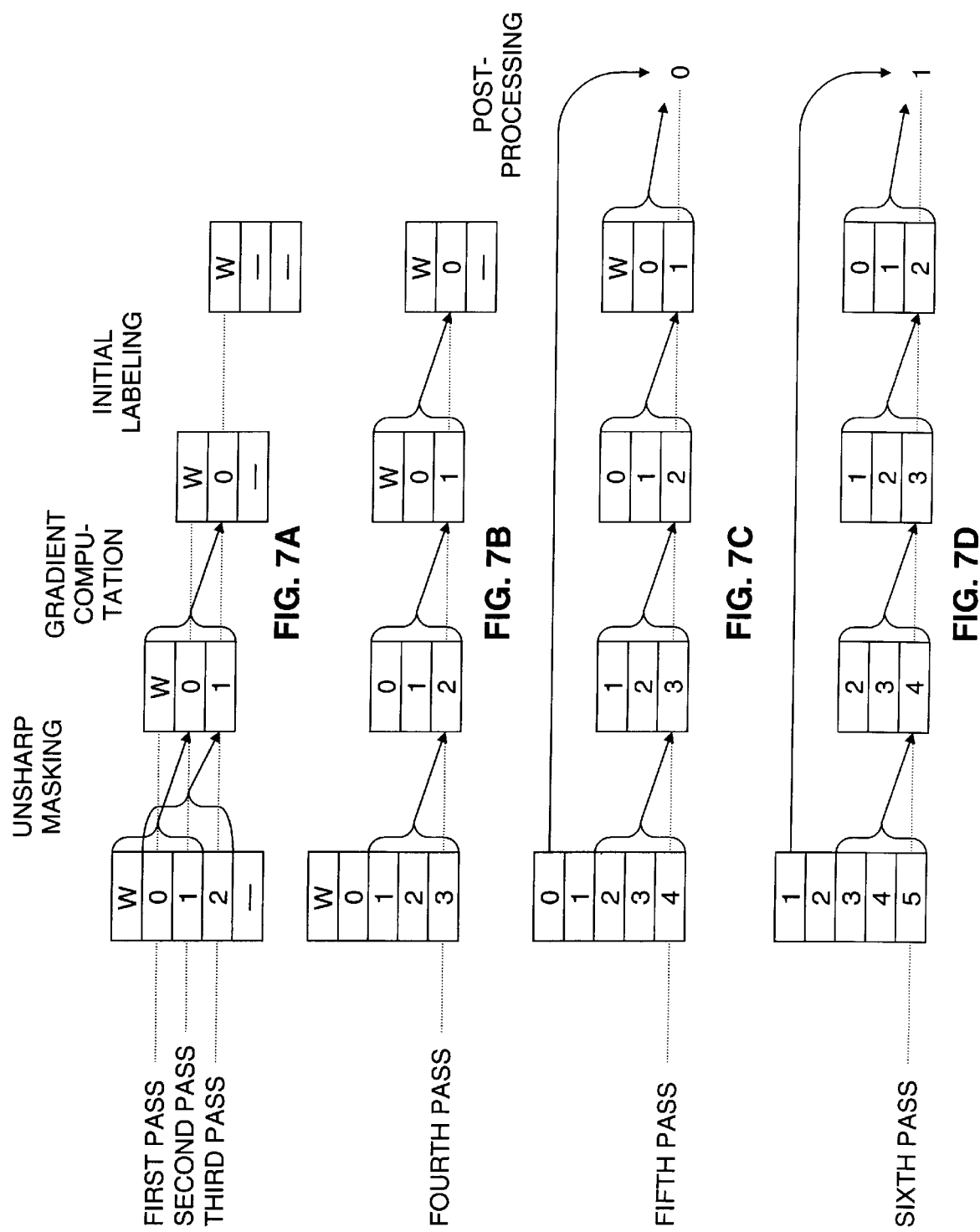

TEXT ENHANCEMENT FOR COLOR AND GRAY-SCALE DOCUMENTS

BACKGROUND OF THE INVENTION

The present invention is directed to image processing and in particular to enhancing the legibility of text in document copies that photocopiers produce.

The vast majority of documents that are photocopied consist primarily of text, and the usefulness of the resultant copy depends greatly on the text's legibility. Unfortunately, many factors in the photocopying environment conspire to reduce text legibility. One of these is that the text may be embedded in a background image, and the copying process may tend to lose the contrast between text and the image and thereby impair the resultant copy's legibility. Another common difficulty arises when a document original is printed on two sides, or there is another document located behind it. It often happens in such situations that the text from the reverse side or other document "bleeds through," making the front-side text hard to read.

Photocopier manufacturers have accordingly attempted to deal with this problem by so processing the scanned digitized image as to emphasize the delineation between text and image or background. Common among the approaches to solving this problem is the use of digital filters that so process the digital image as to emphasize differences between a pixel's value and those of pixels in its immediate neighborhood. This has a tendency to darken text characters' outlines and thus enhance legibility.

But it also has a drawback. Although it does tend to enhance legibility, it also emphasizes annoying aliasing artifacts, which result from digital processing's necessarily discrete nature.

SUMMARY OF THE INVENTION

We have found that, particularly in laser-type photocopiers, legibility enhancement yields less-annoying aliasing results when the text-edge emphasis is placed, not at the highest-gradient locations, but rather in properly selected neighbors of such locations. In one of the invention's embodiments, for instance, we mark a pixel as being a text edge if it has a certain minimum darkness—and, in color systems, sufficiently low saturation—and the magnitude of its brightness gradient is less than a predetermined threshold while that of a neighboring pixel exceeds a predetermined threshold. Each pixel labeled as a text edge is then set to a predetermined dark value, typically maximum black. Because this approach does not eliminate the high gradients adjacent to text edges, it preserves natural gradations whose removal, we have discovered, tends to lead to the annoying aliasing artifacts. It also reduces the tendency, exhibited by some approaches, of widening text-character elements.

According to another aspect of the invention, we additionally assign text-edge labels to pixels that are flanked by previously identified text-edge pixels at which the gradients are oppositely directed away from the pixel thus flanked. This tends to improve the legibility of a character element that is, say, only three or four pixels wide.

As will be described below, some embodiments will refine this initial assignment of text-edge labels by a selective re-labeling, in which text-edge labels are removed from some pixels and newly assigned to others. One of the beneficial effects of such re-labeling is to smooth text edges.

BRIEF DESCRIPTION OF THE DRAWINGS

The invention description below refers to the accompanying drawings, of which:

FIGS. 3A and 3B are diagrams that illustrate respective rules for refining the results of a label-assignment operation that the illustrated embodiment performs;

FIGS. 4A, 4B, and 4C are diagrams that illustrate further rules for refining the results of a label-assignment operation;

FIGS. 7A–H form a diagram that illustrates the pipelining by which FIG. 2's operations can be implemented.

DETAILED DESCRIPTION OF AN ILLUSTRATIVE EMBODIMENT

Figure 1:
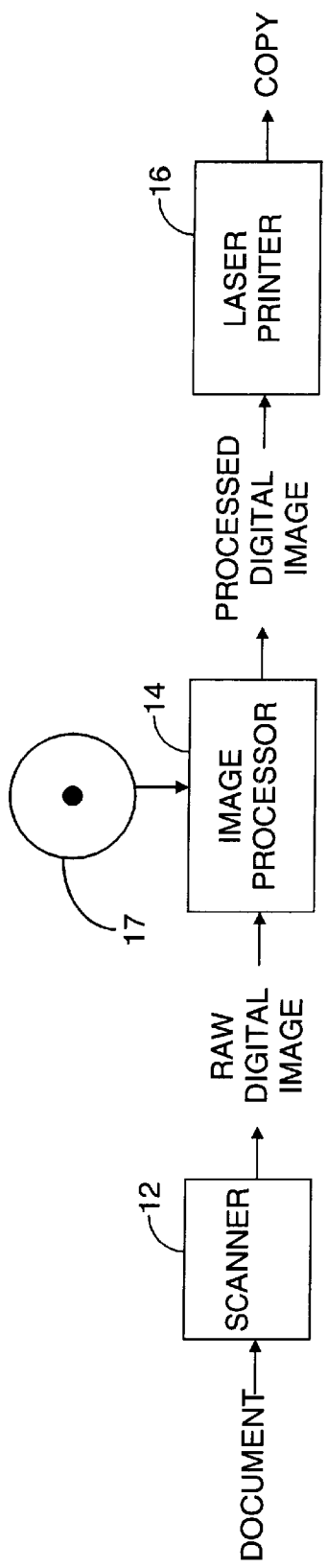
FIG. 1 is a block diagram of a photocopier system that can employ the present invention's teachings.

FIG. 1 depicts the general environment in which the present invention's teachings can be practiced. A photocopier's scanner 12 scans a document and generates digital signals representing the image that it has scanned. The present invention's teachings can be applied to solely gray-scale images, but we will assume for the sake of example that the scanner 12's output represents a color image. That is, for each of a plurality of pixels into which the image is divided, the raw digital image includes a digital value for each of a plurality of color components. Those components are typically red, green, and blue, in which case maximum red in an eight-bit-per-component system is (255, 0, 0), maximum white is (255, 255, 255), and maximum black is (0, 0, 0). Although we assume a color image, it will become apparent that the present invention's teachings apply particularly to documents in which the text itself is black or dark gray on a light background.

Circuitry 14 that incorporates the present invention's teachings processes the digital image to enhance the legibility of its text areas in a manner that will be described below. For the sake of concreteness, we assume that a laser printer mechanism 16 is what employs the resultant output, because the embodiment to be described below yields particularly good laser-printed output. But those skilled in the art will recognize that the invention is applicable to other document-generation technology as well, and its broader teachings may even be used to, say, generate an image on a computer monitor. Also, although the image-processing circuitry would typically be embodied in dedicated hardware firmware-configured to perform the operations described below, the drawing includes a computer disk 17 to indicate that a general-purpose computer could be configured to perform these operations by machine-readable instructions that a computer disk or other storage medium provides.

Figure 2:
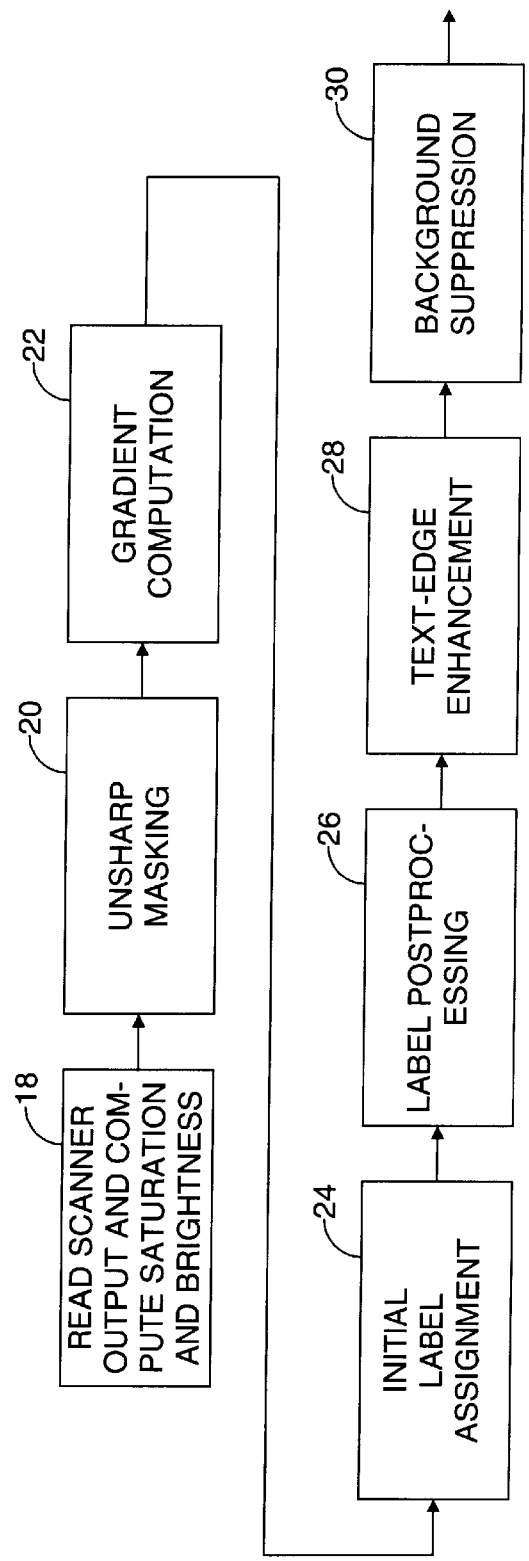
FIG. 2 is a block diagram illustrating the processing steps employed by the image processor that FIG. 1's photocopier system includes.

FIG. 2 depicts a sequence of operations that FIG. 1's image-processing circuitry 14 performs. In operations 18 that will be described in more detail below, the image processor computes each pixel's saturation and brightness for use in subsequent operations. An operation 20 that we refer to below as "unsharp masking" enhances brightness changes, and a subsequent step 22 computes the magnitude of the resultant brightness gradient.

On the basis of these and further operations performed in a labeling step 24, the processing circuitry classifies each pixel as text, light background, or image in accordance with criteria that will be described in more detail below. To improve the accuracy of the resultant classification, a further, post-processing step 26 refines the label assignments by replacing labels in accordance with rules that will be described below.

A text-enhancement operation 28 then transforms each pixel of the input image (or, alternatively, of the unsharp-masking operation 20's output) in accordance with the labels with which step 26 has marked those pixels. Specifically, the value of each pixel marked as text is set to a predetermined value, typically maximum black. A background-suppression operation 30 then generates this processing sequence's output by translating all pixel values in accordance with a transformation that tends to reduce contrast in high-brightness regions.

We now describe each of FIG. 2's steps in detail. Its first step 18 includes saturation and brightness computations. The saturation value, whose use will be described presently, is computed as follows:

$$s_{i,j} = \max(|r_{i,j} - g_{i,j}|, |r_{i,j} - b_{i,j}|, |g_{i,j} - b_{i,j}|), \quad (1)$$

where $s_{i,j}$ is the saturation of the pixel at location (i,j), $r_{i,j}$ is its red value, $g_{i,j}$ is its green value, and $b_{i,j}$ is its blue value. Other well-known saturation measures can be used instead.

The image processor stores this saturation value for later use. It similarly stores a brightness value, which can be computed as, say, $$I_{i,j} = \frac{r_{i,j} + g_{i,j} + b_{i,j}}{3}, \quad (2)$$

where $I_{i,j}$ is the gray-scale intensity, or brightness, at location (i,j). Although equation (2) weights all three color components equally, it may be preferable to weight them differently in accordance with the sensitivities of the respective scanner color channels' charge-coupled devices.

FIG. 2's next operation, the unsharp masking, emphasizes local brightness variations by replacing the red-, green-, and blue-channel values with revised values $r_{i,j}, g_{i,j}$, and $b_{i,j}$ in accordance with the following equations:

$$r'_{i,j} = r_{i,j} + I'_{i,j} - I_{i,j}$$

$$g'_{i,j} = g_{i,j} + I'_{i,j} - I_{i,j},$$

$$b'_{i,j} = b_{i,j} + I'_{i,j} - I_{i,j} \quad (3)$$

where $I'_{i,j}$ is a sharpened gray-scale value.

$I'_{i,j}$ is computed as the following weighted difference between a pixel's gray-level brightness and an average $I''_{i,j}$ of that brightness in a neighborhood around the pixel:

$$I'_{i,j} = \alpha I_{i,j} - \beta I''_{i,j}, \quad (4)$$

where $\alpha$ and $\beta$ are weighting factors. We have employed the values $\alpha=4$ and $\beta=3$ and, in a system in which the pixel-value components are stored as eight-bit unsigned integers, clipped the resultant $I'_{i,j}$ values to the range of 0 to 255.

The average values $I''_{i,j}$ can be computed as, say, elements of a low-pass-filtered gray-scale image I" obtained by convolving the intensity with a low-pass kernel H:

$$I'' = I * H. \quad (5)$$

For images whose resolutions are 300 dots per inch ("dpi"), we have used the following low-pass kernel:

$$H = \frac{1}{16} \begin{bmatrix} 1 & 2 & 1 \\ 2 & 4 & 2 \\ 1 & 2 & 1 \end{bmatrix}, \quad (6)$$

whereas we have used the following kernel for 600-dpi images:

$$H = \frac{1}{100} \begin{bmatrix} 1 & 2 & 4 & 2 & 1 \\ 2 & 4 & 8 & 4 & 2 \\ 4 & 8 & 16 & 8 & 4 \\ 2 & 4 & 8 & 4 & 2 \\ 1 & 2 & 4 & 2 & 1 \end{bmatrix}. \quad (7)$$

FIG. 2's text-edge-enhancement operation 28 revises the various pixel values in this initial processing's output selectively in accordance with a pixel classification that starts with FIG. 2's gradient-computation step 22. In this step the image processor computes a gradient magnitude $G_{ij}$ in accordance with the following equation:

$$G_{i,j} = \frac{1}{3}(|\nabla r_{i,j}| + |\nabla g_{i,j}| + |\nabla b_{i,j}|), \quad (8)$$

where $$|\nabla r_{i,j}| = \sqrt{\nabla_x^2 r_{i,j} + \nabla_y^2 r_{i,j}} \quad (9)$$

and $$\nabla_x r' = r' * S_x \quad \nabla_y r' = r' * S_y$$
$$\nabla_x g' = g' * S_x \quad \nabla_y g' = g' * S_y \quad (10)$$
$$\nabla_x b' = b' * S_x \quad \nabla_y b' = b' * S_y.$$

Here $S_x$ and $S_y$ are horizontal and vertical Sobel kernels with which we convolve the individual color image components. For the 300-dpi case, we have used the following Sobel kernels:

$$S_x = \frac{1}{4}\begin{bmatrix} 1 & 0 & -1 \\ 2 & 0 & -2 \\ 1 & 0 & -1 \end{bmatrix} \quad S_y = \frac{1}{4}\begin{bmatrix} 1 & 2 & 1 \\ 0 & 0 & 0 \\ -1 & -2 & -1 \end{bmatrix}. \quad (11)$$

For the 600-dpi case, the Sobel kernels we have used are:

$$S_x = \frac{1}{16}\begin{bmatrix} -1 & -1 & 0 & 1 & 1 \\ -1 & -2 & 0 & 2 & 1 \\ -2 & -4 & 0 & 4 & 2 \\ -1 & -2 & 0 & 2 & 1 \\ -1 & -1 & 0 & 1 & 1 \end{bmatrix} \quad (12)$$

$$S_y = \frac{1}{16}\begin{bmatrix} 1 & 1 & 2 & 1 & 1 \\ 1 & 2 & 4 & 2 & 1 \\ 0 & 0 & 0 & 0 & 0 \\ -1 & -2 & -4 & -2 & -1 \\ -1 & -1 & -2 & -1 & -1 \end{bmatrix}.$$

With the gradient magnitudes thus computed, we are now ready to identify those that are text-edge pixels. In the illustrated embodiment, a pixel must meet the following criteria to qualify for the text-edge classification. First, its brightness as computed in equation (2) must be lower than a predetermined threshold $T_1$. Second, the saturation, as defined in equation (1) above, must be less than another predetermined threshold $T_2$. Third, its gradient magnitude, as defined in equation (8), must be less than a further threshold $T_3$. Fourth, the gradient magnitude of at least one contiguous pixel must exceed a threshold $T_4$, which we usually set equal to $T_3$. Finally, the pixel's intensity must be less than an average intensity in a predetermined neighborhood around it. For 300 dpi images, the neighborhood is typically the 3×3 region centered on the pixel in question, while the typical neighborhood for 600 dpi images is a 5×5 region.

These criteria tend to identify pixels that are on the edge of a text-element region but not in the character region's high-gradient fringe. Replacing pixels thus identified with maximum black will therefore tend to emphasize a text-character element without eliminating gradations that we believe help suppress aliasing artifacts. If the dark text regions between the edges are reasonably wide, enough legibility ordinarily results without similarly replacing the pixels in those regions.

But some further enhancement is desirable in particularly narrow text-character elements. So a pixel that does not meet all of the foregoing text-edge-pixel criteria nonetheless receives that label if it meets the foregoing brightness and saturation criteria and is flanked in the same row or in the same column by text-edge-labeled pixel having gradients directed away from the pixel in question. That is, the pixel at location (i, j) meeting the above-mentioned low-brightness and -saturation criteria is labeled a text-edge pixel if the pixels at locations (i−1,j) and (i+1,j) have been so labeled and:

$$\nabla_x I'_{i-1,j} < 0 < \nabla_x I'_{i+1,j}, \tag{13}$$

or the pixels at locations (i,j−1) and (i,j+1) have been so labeled and:

$$\nabla_y I'_{i,j-1} < 0 < \nabla_y I'_{i,j+1}. \tag{14}$$

This labels only single pixels so flanked, but the same approach can be extended to two-, three-, or more-pixel sequences, too.

This initial identification of text-edge pixels is refined in the subsequent, label-postprocessing operation 26, which will identify further text-edge pixels and remove some labels initially assigned. To aid in that process, operation 24 also gives light-background or image labels to pixels that are not initially labeled as text-edge pixels. If a pixel's intensity exceeds a threshold $T_5$ and its saturation is less than threshold $T_6$ (which may be equal to $T_2$), then the pixel is classified as light background. Otherwise, it is labeled an image pixel.

FIG. 2's label-postprocessing operation 26 applies rules designed to refine the initial label assignment. The rules are determined empirically and will differ in different implementations, but FIGS. 3A and 3B illustrate two example rules for adding or replacing text labels to reduce the occurrence of "jaggies" in text regions. The B-labeled squares represent pixels initially assigned text labels, whereas the C/W-labeled squares represent pixels labeled as image or light background. Any pattern in FIG. 3A's left column is replaced with the corresponding right-column pattern to eliminate text-region voids. To remove edge protrusions, FIG. 3B's left-column patterns are replaced with the corresponding right-column patterns.

FIGS. 4A, 4B, and 4C illustrate rules that replace isolated labels. As FIG. 4A illustrates, a pixel not initially labeled as light background is re-labeled light background if light-background pixels flank it in its row and column and no diagonally opposite pair of its neighbors both have text labels. FIG. 4B similarly illustrates a rule in accordance with which a pixel not initially labeled as an image pixel is re-labeled an image pixel if image pixels flank it in its row and column and no diagonally opposite pair of its neighbors both have text labels. And FIG. 4C illustrates a rule in accordance with which an originally text-labeled pixel is re-labeled to whatever the majority label among its immediate neighbors is if at most one of that pixel's neighbors originally received a text label.

There may additionally be further operations that affect the label assignment. For example, some labels may be replaced, and new ones may be added, for message-embedding purposes in accordance with the teachings of the commonly assigned U.S. patent application of Bhattacharjya et al. for Information Embedding in Document Copies, which bears Epson Research and Development file number AP055, was filed on the same date as this application, and is hereby incorporated by reference. The edge-enhancement operation 28 then replaces with maximum black (or some other dark value) the values of all pixels that have finally been assigned text-edge labels. This enhances the text's legibility.

All non-text-labeled pixels retain their values. The values retained are typically the original, raw color values loaded in the initial operation 18, but some embodiments may instead use the output of the unsharp-masking operation to obtain some extra sharpness at the cost of color fidelity. In any event, operation 28's output is then subjected to further processing operations that include FIG. 2's background-suppression operation 30.

Figure 5:
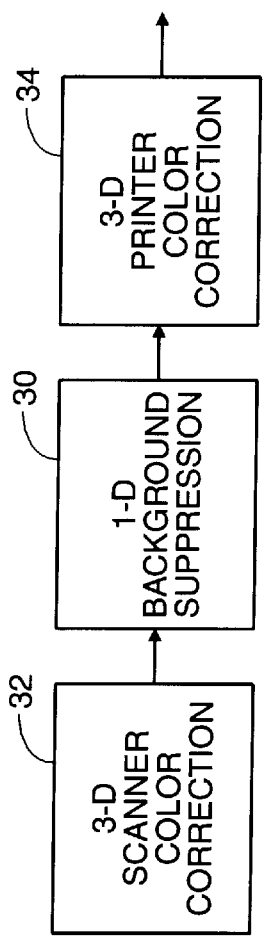
FIG. 5 is a block diagram of FIG. 2's background-removal operation.

FIG. 5 shows that this operation is typically included with other operations such as scanner color correction 32 and printer color correction 34. The purpose of the scanner color-correction operation 32 is to compensate for the scanner's known departures from the ideal correspondence between output values and scanned colors. FIG. 5 depicts the scanner color-correction operation as a "3-D" look-up-table process because its inputs are three-color-component values.

The printer color-correction operation 34 similarly compensates for the printer's known departures from ideal color rendition. It, too, is a three-dimensional look-up table operation. Its output typically is a negative-color, CMY (cyan, magenta, and yellow) representation. Some embodiments will instead produce a CMYK (cyan, magenta, yellow, and black) representation.

Figure 6:
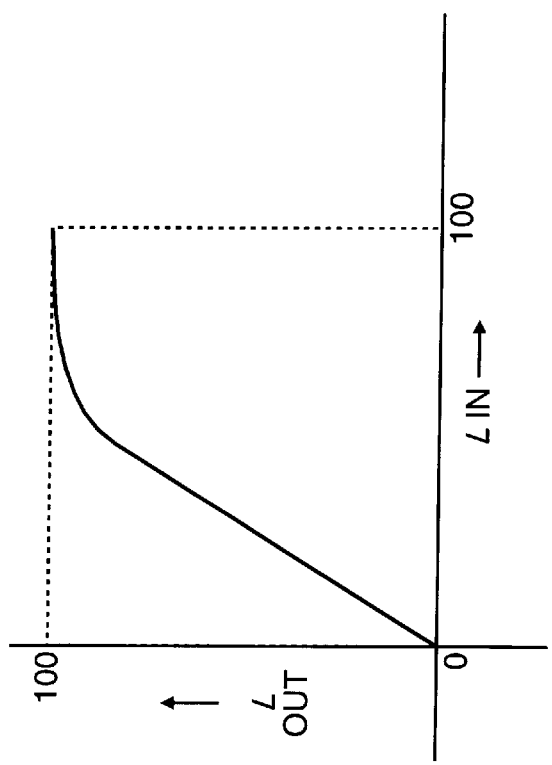
FIG. 6 is a plot of the mapping between the illustrated photocopier's edge-enhanced output and the output of its background-removal operation.
Figure 7E:
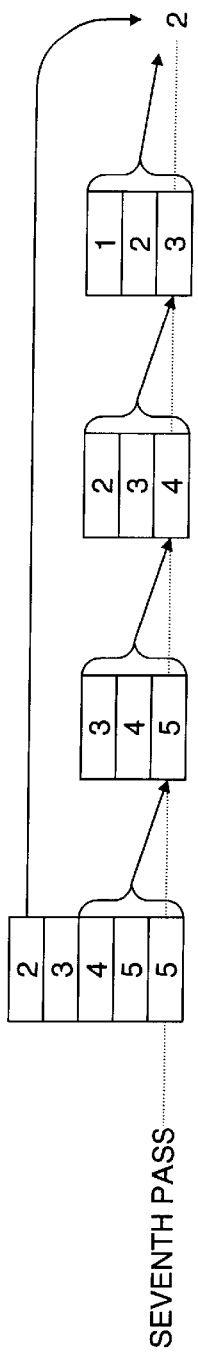
Figure 7F:
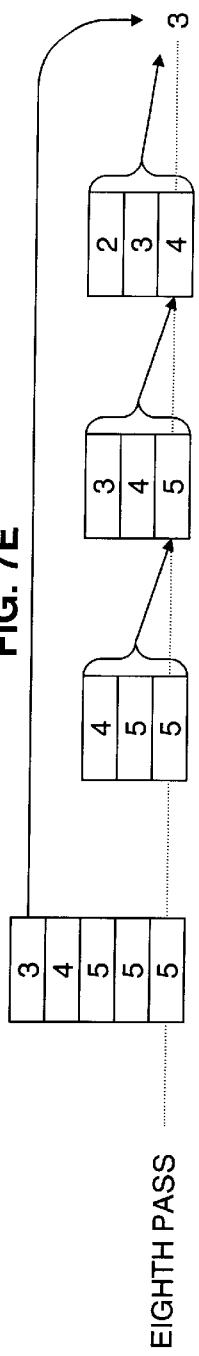
Figure 7G:
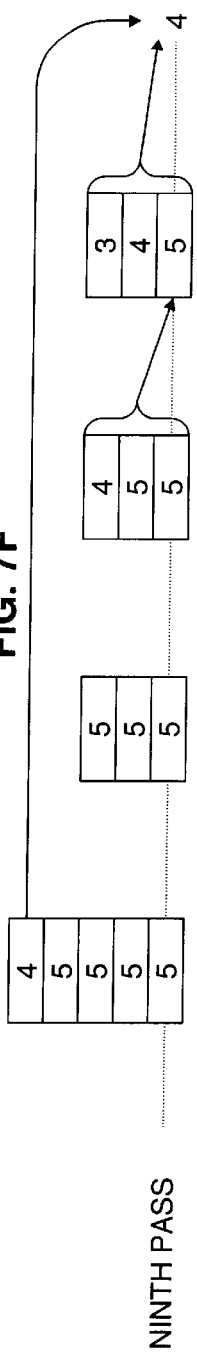
Figure 7H:
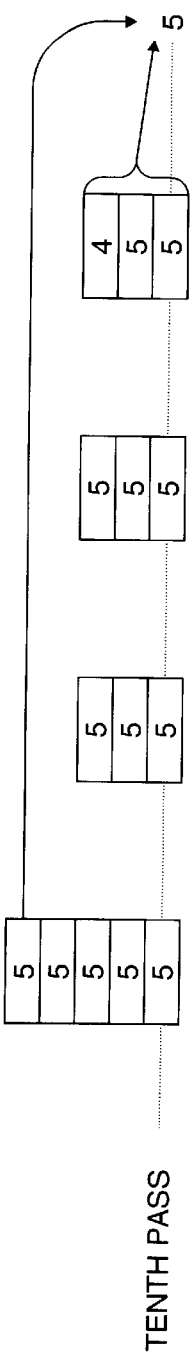

A photocopier may additionally implement other operations between the scanner and printer color-correction operations, but the drawing depicts only the present invention's background-suppression operation 30. Although operation 30 can be thought of as operating on three-dimensional, RGB values, FIG. 5 depicts it as a one-dimensional operation because it is best implemented by performing the algorithmic operations necessary to project each pixel's value from the RGB color space into the Lab color space defined by the Commission Internationale de l' Éclairage, and then using a one-dimensional look-up table to replace only the L component in accordance with a function such as that which FIG. 6 illustrates before reconverting from the resultant Lab value. The FIG. 6 function reduces bright-region contrast and thereby suppresses the visibility of text that would otherwise "bleed through" from the reverse side of the original document.

For purposes of explanation, FIG. 5 depicts operations 30, 32, and 34 as occurring in series, but they would more typically be performed as a single look-up operation in a three-dimensional look-up table precomputed to implement all of those operations and possibly others. Commonly assigned U.S. patent application Ser. No. 09/050,867, filed by Lin et al. on Mar. 30, 1998, for Self-Calibration for Color Image Reproduction Systems, describes a closed-loop way of generating such a look-up table. Also, since a look-up table containing a location for each possible eight-bit-per-component RGB value would require 48 megabytes, interpolation techniques will typically be employed so that a sparser table can be used.

Although the foregoing description may suggest a batch-type sequence in which each step of FIG. 2 is completed for the entire image before the next step begins, FIGS. 7A–H (collectively, "FIG. 7") depict a way of pipelining those operations.

FIG. 7's columns represent buffers for storing the results of respective pipeline operations, and FIG. 7A depicts those buffers' contents at the end of the pipeline operation's first three passes. The first column represents buffers that contain the input red, green, and blue values and the brightness and saturation values computed from them. There are five pixel rows' worth of those buffers. The "W" in the top block of FIG. 7A's first column represents a pixel row's worth of default white values. In an eight-bit-per-component RGB system, for instance, the red, green, and blue contents typically would all be 255, and the brightness and saturation contents would be 255 and 0, respectively. The buffers contain these values before the first pipeline pass.

The "0," "1," and "2" entries in first column's next three blocks indicate that those buffers' next three rows contain the input image's zeroth, first, and second lines of color, saturation, and brightness values, which are loaded during the first, second, and third passes, respectively. At the end of the third pass, those buffers' fifth rows have not been loaded.

The second column represents the contents of buffer allocated to storing the unsharp-masking results. That buffer is large enough to contain three pixel rows' worth of that operation's results. Its first-pass, "W" entry represents a row of the default white value (255, 255, 255), which is simply loaded into that buffer during the first pass without being computed from the input image. In the example that FIG. 7 illustrates, we assume a system in which the kernels mentioned above are 3×3 arrays, so the zeroth row of unsharp-masking results cannot be computed until the second pass, when the first input-pixel row is loaded. So FIG. 7A depicts the zeroth row of unsharp-masking results as having been loaded during the second pass, and the second row of unsharp-masking results as having been loaded during the third pass. At the end of the third pass, the unsharp-masking buffer is full.

The third column represents a buffer for storing three rows of the gradient-computation operation's outputs. Its second-pass, "W" entry represents a row of the value (namely, zero) that would result from computing the gradient of a pure-white image. The third-pass, "0" entry represents the zeroth row's gradient values, which can be computed in accordance with equation (8) during the third pass, when the zeroth-through second-row unsharp-masking results are available. At the end of the third pass, the gradient buffer's last row cannot yet be filled.

The fourth column represents a three-row buffer for containing labels, and its third-pass, "W" entry represents a row's worth of light-background labels, since that is the label that would ordinarily be applied to the pixels of a plain white image. At the end of the third pass, the label buffer's other two rows cannot yet be filled.

FIG. 7B represents those buffers' contents at the end of the fourth pass, during which the input buffers receive the third image row's color, brightness, and saturation values. The image processor computes another row of results for all of the buffers, including the label buffer, since that buffer's zeroth-row contents can be computed from the now-available zeroth through second rows of gradient values. Since the values contained in the unsharp-masking buffer's top row at the end of the third pass are no longer required, that buffer's contents are rotated: the previous contents of the top row are discarded to make room for the values newly stored during the fourth pass.

FIG. 7C represents the buffers' contents at the end of the fifth pass, during which the input buffers receive the fourth image row's color, brightness, and saturation values. The input buffers are rotated to make room for the new values, and unsharp-masking buffers are rotated to make room for new values, too. After the fifth pass, all buffers rotate on every pass.

It is during this pass that the zeroth output row can be computed, since the zeroth through second rows of labels are available. The "post-processing" legend represents not only the label post processing but also the edge-enhancement and background-suppression operations, in which the labeled pixels' values are replaced with maximum black, while the other values are passed unaltered to any further operations. So these operations' inputs for the zeroth row are not only the default-value row through first row of initially assigned labels but also the zeroth-row values in the input buffers. This is why the input buffers are big enough to contain five rows: they must store a row until the edge-enhancement and background-suppression operations are ready for them.

As was just explained, the illustrated arrangement uses the default white value to provide flanking-row inputs to kernel operations for the first pixel row, and the same default value could be used for the last row's kernel operations. But FIGS. 7E through 7H depict an alternative approach, in which those inputs are provided by repeating the bottom pixel row. If the image has only six rows (0–5), then the sixth-pass, "5" entry in the first column represents loading the last input pixel. To provide a flanking row for the last row's unsharp-masking output, the last row is loaded again during the seventh pass: the buffer will have two identical rows. The image processor uses these duplicate rows together with the already-stored fourth pixel row to generate the fifth row's gradient values. Other buffers similarly duplicate their last rows to provide necessary inputs to the pipeline stages that they supply.

Although the present invention has been described in terms of a color (three-component-per-pixel) photocopier, it can readily be adapted to a gray-scale (single-component-per-pixel) machine; all that is required is to omit the saturation criteria. Also, although the foregoing discussion sets forth example formulas for saturation, intensity, and gradient computations, other known ways of computing these quantities can be employed instead. And, while the invention is particularly beneficial in a photocopier that employs a laser printing mechanism, its teachings can also be applied by systems that use other rendering apparatus. So the present invention can be practiced in a wide range of embodiments and thus constitutes a significant advance in the art.

What is claimed is:

1. A photocopier comprising:

A) an optical scanner for scanning a document and generating electrical source-image signals representing a source image of the document;

B) image-processing circuitry responsive to the source-image signals for performing a sequence of image-revision steps, in which sequence each image-revision step receives an input image consisting of input pixels and produces therefrom an output image consisting of output pixels, the input image of the first image-revision step is the source image, the input image of a subsequent image-revision step is the output image of the preceding image-revision step, and the image-processing circuitry generates electrical copy-image signals representing the output image of the last image-revision step, wherein:

i) one of said image-revision steps is a labeling operation that includes a first labeling step in which a plurality of the pixels in the first labeling step's output image are labeled as text pixels, a pixel in the first labeling step's output image being labeled a text pixel in the first labeling step only if the intensity of the subject input pixel to which that output pixel corresponds is less than an intensity threshold and the gradient at least at one pixel in a predetermined neighborhood of the subject input pixel is greater than a predetermined gradient threshold that exceeds the gradient at the subject pixel, said labeling operation further including a label-refining step in which each pixel labeled as a text pixel in the first labeling step is re-classified as a non-text pixel if adjacent row and column pixels of that pixel are each non-text pixels and no diagonally opposite pixel pair are text pixels; and ii) a subsequent image-revision step is a substitution operation that includes the step of setting the value of an output pixel in the labeling operation's output image to a predetermined text value if it is labeled as a text pixel; and C) a printer mechanism responsive to the copy-image signals for printing the image represented thereby.

2. A photocopier as defined in claim 1 wherein the labeling operation additionally includes a second labeling step in which a plurality of the pixels in the labeling operation's output image are labeled as text pixels, a pixel in the labeling operation's output image being labeled a text pixel only if the subject input pixel to which that output pixel corresponds is flanked by pixels at which the intensity gradients are oppositely directed away from the subject pixel and have magnitudes that exceed a gradient threshold that exceeds the magnitude of the gradient at the subject pixel.

3. A photocopier as defined in claim 1 wherein the first labeling step labels a pixel in the labeling operation's output image a text pixel only if the brightness of the subject input pixel to which that output pixel corresponds is less than an average brightness in a predetermined neighborhood of the subject input pixel.

4. A photocopier as defined in claim 1 wherein the first labeling step labels a pixel in the labeling operation's output image a text pixel only if the saturation of the subject input pixel to which that output pixel corresponds is less than a saturation threshold.

5. A photocopier as defined in claim 1 wherein the printer mechanism comprises a laser printer mechanism.

6. A method of printing document copies comprising the steps of:

A) optically scanning a document and generating electrical source-image signals representing a source image of the document;

B) receiving the source-image signals and processing the source image represented thereby in a sequence of image-revision steps, in which sequence each image-revision step receives an input image consisting of input pixels and produces therefrom an output image consisting of output pixels, the input image of the first image-revision step is the source image, the input image of a subsequent image-revision step is the output image of the preceding image-revision step, and image-processing circuitry generates electrical copy-image signals representing the output image of the last image-revision step, wherein:

i) one of said image-revision steps is a labeling operation that includes a first labeling step in which a plurality of the pixels in the first labeling step's output image are labeled as text pixels, a pixel in the first labeling step's output image being labeled a text pixel in the first labeling step only if the intensity of the subject input pixel to which that output pixel corresponds is less than an intensity threshold and the gradient at least at one pixel in a predetermined neighborhood of the subject input pixel is greater than a predetermined gradient threshold that exceeds the gradient at the subject pixel, said labeling operation further including a label-refining step in which each pixel labeled as a text pixel in the first labeling step is re-classified as a non-text pixel if adjacent row and column pixels of that pixel are each non-text pixels and no diagonally opposite pixel pair are text pixels; and ii) a subsequent image-revision step is a substitution operation that includes the step of setting the value of an output pixel in the labeling operation's output image to a predetermined text value if it is labeled as a text pixel; and C) responding to the copy-image signals by employing a printer mechanism to print the image that the copy-image signals represent.

7. A method as defined in claim 6 wherein the labeling operation additionally includes a second labeling step in which a plurality of the pixels in the labeling operation's output image are labeled as text pixels, a pixel in the labeling operation's output image being labeled a text pixel only if the subject input pixel to which that output pixel corresponds is flanked by pixels at which the intensity gradients are oppositely directed away from the subject pixel and have magnitudes that exceed a gradient threshold that exceeds the magnitude of the gradient at the subject pixel.

8. A method as defined in claim 6 wherein the first labeling step labels a pixel in the labeling operation's output image a text pixel only if the brightness of the subject input pixel to which that output pixel corresponds is less than an average brightness in a predetermined neighborhood of the subject input pixel.

9. A method as defined in claim 6 wherein the first labeling step labels a pixel in the labeling operation's output image a text pixel only if the saturation of the subject input pixel to which that output pixel corresponds is less than a saturation threshold.

10. A method as defined in claim 6 wherein the printer mechanism comprises a laser printer mechanism.

11. A storage medium containing instructions readable by a computer to configure the computer to function as an image processor for:

A) receiving source-image signals representing a source image;

B) performing a sequence of image-revision steps, in which sequence:

i) each image-revision step receives an input image consisting of input pixels and produces therefrom an output image consisting of output pixels;

ii) the input image of the first image-revision step is the source image;

iii) the input image of a subsequent image-revision step is the output image of the preceding image-revision step;

iv) one of said image-revision steps is a labeling operation that includes a first labeling step in which a plurality of the pixels in the first labeling step's output image are labeled as text pixels, a pixel in the first labeling step's output image being labeled a text pixel in the first labeling step only if the intensity of the subject input pixel to which that output pixel corresponds is less than an intensity threshold and the gradient at least at one pixel in a predetermined neighborhood of the subject input pixel is greater than a predetermined gradient threshold that exceeds the gradient at the subject pixel, said labeling operation further including a label-refining step in which each pixel labeled as a text pixel in the first labeling step is re-classified as a non-text pixel if adjacent row and column pixels of that pixel are each non-text pixels and no diagonally opposite pixel pair are text pixels; and v) a subsequent image-revision step is a substitution operation that includes the step of setting the value of an output pixel in the labeling operation's output image to a predetermined text value if it is labeled as a text pixel; and C) generating electrical copy-image signals representing the output image of the last image-revision step.

12. A storage medium as defined in claim 11 wherein the labeling operation additionally includes a second labeling step in which a plurality of the pixels in the labeling operation's output image are labeled as text pixels, a pixel in the labeling operation's output image being labeled a text pixel only if the subject input pixel to which that output pixel corresponds is flanked by pixels at which the intensity gradients are oppositely directed away from the subject pixel and have magnitudes that exceed a gradient threshold that exceeds the magnitude of the gradient at the subject pixel.

13. A storage medium as defined in claim 11 wherein the first labeling step labels a pixel in the labeling operation's output image a text pixel only if the brightness of the subject input pixel to which that output pixel corresponds is less than an average brightness in a predetermined neighborhood of the subject input pixel.

14. A storage medium as defined in claim 11 wherein the first labeling step labels a pixel in the labeling operation's output image a text pixel only if the saturation of the subject input pixel to which that output pixel corresponds is less than a saturation threshold.

* * * * *